W. B. MOUNTENEY.
WATER-METER.

No. 169,368.

Patented Nov. 2, 1875.

Witnesses
F. B. Townsend
Joseph C. Wildman

Inventor.
Wm. B. Mounteney
by A. N. Evans & Co
Attorneys.

W. B. MOUNTENEY.
WATER-METER.

No. 169,368.

Patented Nov. 2, 1875.

Witnesses
F. B. Townsend
R. K. Evans

Inventor
Wm. B. Mounteney
by H. H. Evans & Co.
attys

UNITED STATES PATENT OFFICE.

WILLIAM B. MOUNTENEY, OF CHICAGO, ILLINOIS.

IMPROVEMENT IN WATER-METERS.

Specification forming part of Letters Patent No. 169,368, dated November 2, 1875; application filed September 1, 1875.

*To all whom it may concern:*

Be it known that I, WILLIAM B. MOUNTENEY, of Chicago, Illinois, have invented certain new and useful Improvements in Water-Meters, of which the following is a full, clear, and exact description, reference being had to the accompanying drawings making a part of this specification, in which—

Figure 1:
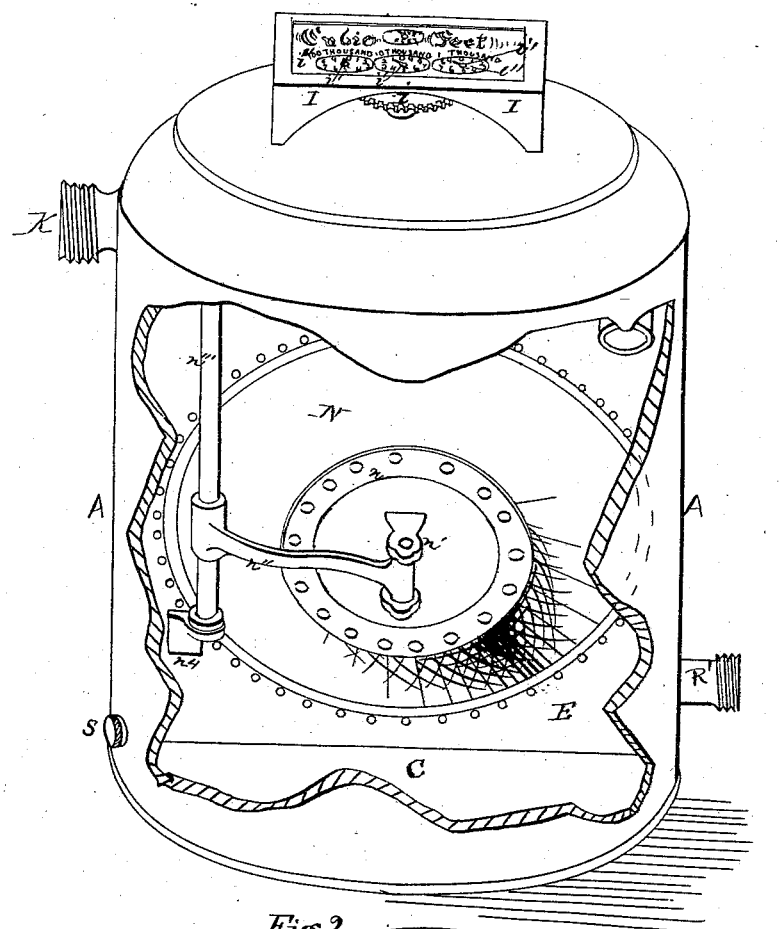
Figure 2:
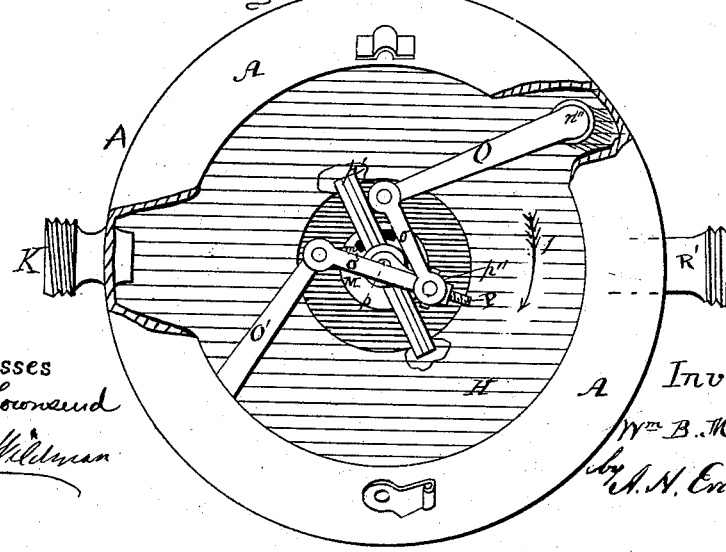
Figure 3:
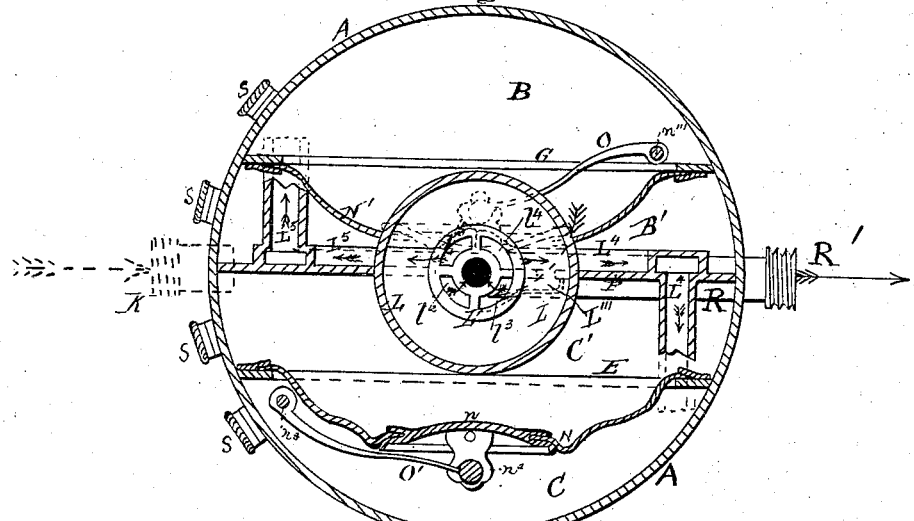

Figure 1 represents a perspective view, partly in section; Fig. 2 a plan view, with the upper plate and indicator mechanism removed; Fig. 3, a longitudinal, and Fig. 4 a vertical, section of a water-meter constructed according to my invention. Figs. 5 and 6 represent detail views of the valve separately.

My invention relates to improvements in water-meters, the nature of which will be hereinafter fully explained; and it consists in the combination and arrangement of parts hereinafter described and claimed.

Figure 4:
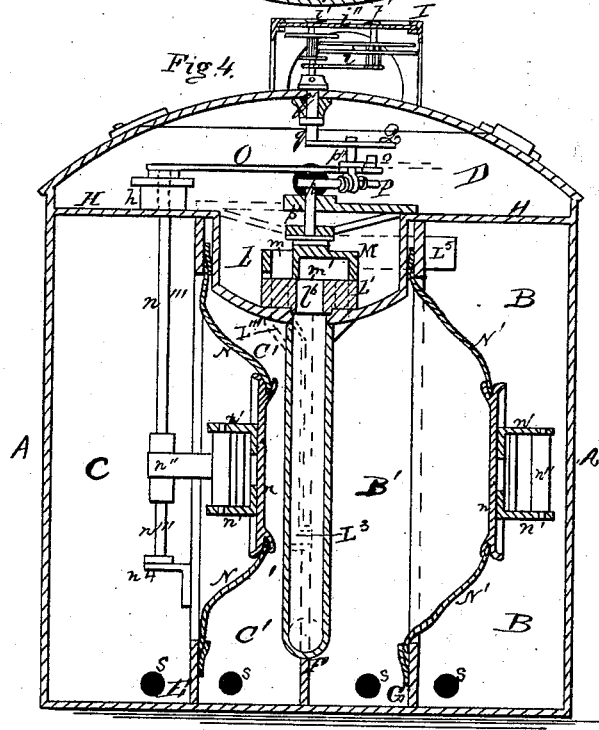

In the said drawings, A A represent the main casing, which is, by preference, formed circular, and divided into five chambers, B B', C C', and D, by means of partitions E F G H. Upon the upper side of the meter is arranged an index-case, I, containing a train of gears, $i$, and provided with index-hands $i'$ and dial $i''$, as shown in Figs. 1 and 4. K is the inlet-pipe through which the water is supplied to the meter. The water entering the meter passes from the pipe K into the chamber D, in the center of which is formed a well, L, at the bottom of which is affixed a circular valve-seat, $L^1$, provided with four apertures, $l^2 \, l^3 \, l^4 \, l^5$, which are opened and closed alternately by means of a circular valve, M, which is formed with a passage, $m$, vertically through the same slightly larger in area than one of the passages $l^2 \, l^3 \, l^4 \, l^5$, and also with a passage, $m'$, so formed as to at all times connect one or a pair of passages, $l^2 \, l^3 \, l^4 \, l^5$, with a central aperture, $l^6$, in the valve-seat $L^1$. The aperture $l^2$ leads directly into the chamber C', and the aperture $l^3$, by means of a pipe or tube, $L^3$, (shown by dotted lines in Figs. 3 and 4,) passing down within the chamber C', and through to the opposite face of the partition F, is connected with the chamber B', whilst the aperture $l^4$, by means of the passage $L^4$, is connected with the chamber C, and the aperture $l^5$, by the passage $L^5$, with the chamber B.

The partitions E and G are formed with circular apertures, to the edges of which are connected flexible diaphragms N N', to the centers of each of which are attached plates $n$, provided with brackets or bearings $n'$ for one end of a vibrating arm, $n''$, the opposite end of which is rigidly connected to a vertical shaft, $n^3$, turning at its lower end in the bearing $n^4$, while its upper end passes up through a stuffing-box, $h$, into the chamber D, where the vertical shafts $n^3$ are provided with lever-arms O O', which, by means of links $o \, o'$, are connected to a crank-arm, P, connected to a vertical shaft, $p$, working in a bearing, $p^1$, and actuating the rotary valve M. On the crank-arm P is formed a stud or pin, $p^2$, passing through a slot in an arm, Q, Fig. 4, extending from a vertical index-shaft, $q$, working in bearings $q'$, and at its upper end attached to one of the train of gears, $i$. The operation of the apparatus is as follows: Supposing the parts to be in the position shown by the drawings at Figs. 1, 2, and 3, and water entering the meter under pressure by the inlet-pipe K, it will first enter the chamber D, from which it will pass by the apertures $l^4 \, l^5$ into the compartments B C, and out of the chambers B' C', by means of the apertures $l^3 \, l^2$ and the passage $m'$ in the valve M, to the central aperture $l^6$, from which it is conducted by a passage, R, to the outlet-pipe R', which is connected to the supply-pipe. The water will continue to flow into the chambers B C until, by its pressure on the diaphragm, it has caused the arms $n''$, by means of the vertical rods, lever-arm, links $o \, o'$, and the crank-shaft, to cause the valve M to revolve on its axis in the direction of the arrow 1, Fig. 2, when it will first close the aperture $l^5$, and then the aperture $l^4$, from connection with the water-supply, and at the same time first closing the aperture $l^3$, and then the aperture $l^2$, from connection with the outlet-pipe R. It will thus be readily seen that the water under pressure is alternately conducted to, and allowed to flow from, opposite sides of the pair of diaphragms N N' in such manner that both diaphragms shall be caused to traverse alternately backward and forward, and by means of the arms $n^2$, rods $n^3$, links $o \, o'$, crank-arm P, causing the revolution of the valve M and the index-gears $i$. The valve M, at each revolution, causing the chambers to be alternately filled and emptied, a given quantity of water will be passed through the meter at each revolution, which quantity, by means of the index gears and hands, will be indicated on the dial.

S S are screw plugs or valves for withdrawing the liquid from the chambers when desired.

Having thus described my invention, what I claim as new, and desire to secure by Letters Patent, is—

1. In a meter for measuring liquids, the combination, with the chambers B B' C C' and diaphragms N N', of the chamber D, provided with a well, L, and valve-seat $L^1$, having apertures $l^2\ l^3\ l^4\ l^5$, controlled by a revolving valve, M, formed with passages $m\ m'$, substantially as shown and described.

2. The combination, with the chambers B B', C C', and D, and well L, of the seat $L^1$, apertures $l^2\ l^3\ l^4\ l^5\ l^6$, valve M, passages $L^3$, $L^4$, $L^5$, and R, all constructed substantially as described.

3. In a water-meter provided with chambers B B' C C', the inlets and outlets to which are controlled by a revolving valve, M, the combination, with the diaphragms N N', of the plates $n$, arms $n^2$, shafts or rods $n^3$, links $o\ o'$, crank-arm P, slotted arm Q, shaft $q$, and index-gears $i$, substantially as shown and described.

WILLIAM BARTHOLOMEW MOUNTENEY.

Witnesses:
F. W. WOLF,
ROBERT R. JAMPOLIS.